(12) United States Patent
Tsai et al.

(10) Patent No.: US 9,897,782 B1
(45) Date of Patent: Feb. 20, 2018

(54) SIX-PIECE OPTICAL LENS SYSTEM WITH A WIDE FIELD OF VIEW

(71) Applicant: NEWMAX TECHNOLOGY CO., LTD., Tai-Chung (TW)

(72) Inventors: Fei-Hsin Tsai, Tai-Chung (TW); Shu-Tzu Lai, Tai-Chung (TW)

(73) Assignee: NEWMAX TECHNOLOGY CO., LTD., Tai-Chung (TW)

( * ) Notice: Subject to any disclaimer, the term of this patent is extended or adjusted under 35 U.S.C. 154(b) by 0 days.

(21) Appl. No.: 15/375,056

(22) Filed: Dec. 9, 2016

(51) Int. Cl.
*G02B 13/18* (2006.01)
*G02B 3/02* (2006.01)
*G02B 9/60* (2006.01)
*G02B 13/00* (2006.01)
*G02B 9/62* (2006.01)
*G02B 5/00* (2006.01)
*G02B 5/20* (2006.01)
*G02B 27/00* (2006.01)

(52) U.S. Cl.
CPC ......... *G02B 13/0045* (2013.01); *G02B 5/005* (2013.01); *G02B 5/208* (2013.01); *G02B 9/62* (2013.01); *G02B 27/0025* (2013.01)

(58) Field of Classification Search
CPC ....... G02B 13/0045; G02B 9/62; G02B 13/04
USPC ................................. 359/713, 752, 756, 770
See application file for complete search history.

(56) References Cited

U.S. PATENT DOCUMENTS

| 8,335,043 B2 | 12/2012 | Huang |
| 8,395,853 B2 | 3/2013 | Chen et al. |
| 8,576,497 B2 | 11/2013 | Hsu et al. |
| 8,593,737 B2 | 11/2013 | Tang et al. |
| 2014/0247507 A1* | 9/2014 | Tsai .......................... G02B 9/62 359/713 |

* cited by examiner

*Primary Examiner* — William Choi
(74) *Attorney, Agent, or Firm* — Bruce Stone LLP; Joseph Bruce (57) ABSTRACT

A six-piece optical lens system with a wide field of view includes, in order from the object side to the image side: a first lens element with a negative refractive power, a second lens element with a positive refractive power, a stop, a third lens element with a positive refractive power, a fourth lens element with a negative refractive power, a fifth lens element with a positive refractive power, a sixth lens element with a negative refractive power. Abbe numbers of the third, fourth, fifth, sixth lens elements are V3, V4, V5, V6, a focal length of the six-piece optical lens system with a wide field of view is f, a distance from an object-side surface of the first lens element to an image plane along an optical axis is TL, satisfying the relations: $29<V3-V4<42$; $29<V5-V6<42$; $0.1<f/TL<0.4$.

22 Claims, 8 Drawing Sheets

SIX-PIECE OPTICAL LENS SYSTEM WITH A WIDE FIELD OF VIEW

BACKGROUND OF THE INVENTION

Field of the Invention

The present invention relates to an optical lens system with a wide field of view, and more particularly to a miniaturized six-piece optical lens system with a wide field of view which is applicable to electronic products.

Description of the Prior Art

In recent years, with the popularity of electronic products with the function of taking photographs, there's an increasing demand for an optical lens system. In order to obtain a wider shooting range, the lens angle should meet certain requirements. The field of view of the lens is usually designed to be 50 to 60 degrees, if over the above design angle, the aberration is larger and the lens design is more complex. For example, the optical lens systems as disclosed in U.S. Pat. Nos. 8,335,043 and 8,576,497 use two lens groups and 5-6 pieces of lens elements to obtain a wide field of view, however, their distortion is increased. The optical lens systems as disclosed in U.S. Pat. Nos. 8,593,737, 8,576,497 and 8,395,853 also have a wide field of view, but their TL (total length) of the entire optical lens system is too long.

Therefore, how to develop a miniaturized optical lens system with a wide field of view which not only can be applied to lenses of the electronic products, such as, digital camera, Webcam, mobile phone and so on, but also has a wide field of view, the imaging capability of visible wavelength and infrared single wavelength, and can reduce the aberration and the design complexity is the motivation of the present invention.

The present invention mitigates and/or obviates the aforementioned disadvantages.

SUMMARY OF THE INVENTION

The primary objective of the present invention is to provide a six-piece optical lens system which has a wide field of view, the imaging capability of visible wavelength and infrared single wavelength, high resolution, short length and less distortion.

Therefore, a six-piece optical lens system with a wide field of view in accordance with the present invention comprises, in order from an object side to an image side: a first lens element with a negative refractive power having an object-side surface being convex near an optical axis and an image-side surface being concave near the optical axis, at least one of the object-side surface and the image-side surface of the first lens element being aspheric; a second lens element with a positive refractive power having an object-side surface being convex near the optical axis and an image-side surface being convex near the optical axis, at least one of the object-side surface and the image-side surface of the second lens element being aspheric; a stop; a third lens element with a positive refractive power having an object-side surface being convex near the optical axis and an image-side surface being convex near the optical axis, at least one of the object-side surface and the image-side surface of the third lens element being aspheric; a fourth lens element with a negative refractive power having an image-side surface being concave near the optical axis, at least one of an object-side surface and the image-side surface of the fourth lens element being aspheric; a fifth lens element with a positive refractive power having an object-side surface being convex near the optical axis and an image-side surface being convex near the optical axis, at least one of the object-side surface and the image-side surface of the fifth lens element being aspheric; a sixth lens element with a negative refractive power having an object-side surface being convex near the optical axis and an image-side surface being concave near the optical axis, at least one of the object-side surface and the image-side surface of the sixth lens element being aspheric and provided with at least one inflection point.

Wherein an Abbe number of the third lens element is V3, an Abbe number of the fourth lens element is V4, an Abbe number of the fifth lens element is V5, an Abbe number of the sixth lens element is V6, a focal length of the six-piece optical lens system with a wide field of view is f, a distance from the object-side surface of the first lens element to the image plane along the optical axis is TL, and they satisfy the following relations: $29<V3-V4<42$; $29<V5-V6<42$; $0.1<f/TL<0.4$.

Preferably, a focal length of the first lens element is f1, a focal length of the second lens element is f2, and they satisfy the relation: $-0.5<f1/f2<-0.2$, so that the refractive power of the first lens element and the second lens element are more suitable, it will be favorable to obtain a wide field of view and avoid the excessive increase of aberration of the system.

Preferably, the focal length of the second lens element is f2, a focal length of the third lens element is f3, and they satisfy the relation: $4.0<f2/f3<7.0$, so that the refractive power of the third lens element can be distributed effectively and will not be too large, it will be favorable to reduce the sensitivity of the system and reduce the aberration.

Preferably, the focal length of the third lens element is f3, a focal length of the fourth lens element is f4, and they satisfy the relation: $-1.05<f3/f4<-0.7$, so that the refractive power of the system can be balanced effectively, so as to correct the aberration of the six-piece optical lens system with a wide field of view.

Preferably, the focal length of the fourth lens element is f4, a focal length of the fifth lens element is f5, and they satisfy the relation: $-1.2<f4/f5<-0.8$, so that the chromatic aberration of the lens group of the image system can be balanced and the image quality can be improved.

Preferably, the focal length of the fifth lens element is f5, a focal length of the sixth lens element is f6, and they satisfy the relation: $-0.7<f5/f6<-0.35$, so that the refractive power of the rear group lens system is more balanced, it will be favorable to reduce the sensitivity of the system and correct the high order aberrations of the system.

Preferably, the focal length of the first lens element is f1, the focal length of the third lens element is f3, and they satisfy the relation: $-2.1<f1/f3<-1.5$, so that the refractive power of the first lens element can be distributed effectively, so as to reduce the sensitivity of the six-piece optical lens system with a wide field of view.

Preferably, the focal length of the second lens element is f2, the focal length of the fourth lens element is f4, and they satisfy the relation: $-6.0<f2/f4<-3.5$, which is favorable to increase the field of view and enlarge the stop of the six-piece optical lens system with a wide field of view. Meanwhile, the assembling tolerance can be reduced to improve yield rate.

Preferably, the focal length of the third lens element is f3, the focal length of the fifth lens element is f5, and they satisfy the relation: $0.65<f3/f5<1.1$, which is favorable to increase the field of view and enlarge the stop of the six-piece optical lens system with a wide field of view. Meanwhile, the assembling tolerance can be reduced to improve yield rate.

Preferably, the focal length of the fourth lens element is f4, the focal length of the sixth lens element is f6, and they satisfy the relation: $0.4<f4/f6<0.75$, which can reduce the sensitivity and the total length of the six-piece optical lens system with a wide field of view.

Preferably, a focal length of the first lens element and the second lens element combined is f12, the focal length of the third lens element is f3, and they satisfy the relation: $-4.2<f12/f3<-2.8$. If f12/f3 satisfies the above relation, a wide field of view can be obtained and the resolution can be improved evidently.

Preferably, a focal length of the second lens element and the third lens element combined is f23, the focal length of the fourth lens element is f4, and they satisfy the relation: $-0.95<f23/f4<-0.67$, which is favorable to increase the field of view and enlarge the stop of the six-piece optical lens system with a wide field of view. Meanwhile, the assembling tolerance can be reduced to improve yield rate.

Preferably, a focal length of the second lens element and the third lens element combined is f23, a focal length of the fourth lens element and the fifth lens element combined is f45, and they satisfy the relation: $0.05<f23/f45<0.5$. If f23/f45 satisfies the above relation, a wide field of view, high pixel and low height can be provided and the resolution can be improved evidently. Contrarily, if f23/f45 exceeds the above range, the performance and resolution of the six-piece optical lens system with a wide field of view will be reduced, and the yield rate will be low.

Preferably, the focal length of the first lens element and the second lens element combined is f12, a focal length of the third lens element and the fourth lens element combined is f34, and they satisfy the relation: $-1.65<f12/f34<-1.0$. If f12/f34 satisfies the above relation, a wide field of view, high pixel and low height can be provided and the resolution can be improved evidently. Contrarily, if f12/f34 exceeds the above range, the performance and resolution of the six-piece optical lens system with a wide field of view will be reduced, and the yield rate will be low.

Preferably, the focal length of the third lens element and the fourth lens element combined is f34, a focal length of the fifth lens element and the sixth lens element combined is f56, and they satisfy the relation: $1.0<f34/f56<2.4$. If f34/f56 satisfies the above relation, a wide field of view, high pixel and low height can be provided and the resolution can be improved evidently. Contrarily, if f34/f56 exceeds the above range, the performance and resolution of the six-piece optical lens system with a wide field of view will be reduced, and the yield rate will be low.

Preferably, the focal length of the fourth lens element and the fifth lens element combined is f45, the focal length of the sixth lens element is f6, and they satisfy the relation: $-1.4<f45/f6<-2.5$. If f45/f6 satisfies the above relation, a wide field of view, high pixel and low height can be provided and the resolution can be improved evidently. Contrarily, if f45/f6 exceeds the above range, the performance and resolution of the six-piece optical lens system with a wide field of view will be reduced, and the yield rate will be low.

Preferably, the focal length of the first lens element is f1, a focal length of the second lens element, the third lens element and the fourth lens element combined is f234, and they satisfy the relation: $-1.3<f1/f234<-0.8$. Appropriate refractive power is favorable to reduce the spherical aberration and astigmatism of the six-piece optical lens system with a wide field of view effectively.

Preferably, the focal length of the second lens element, the third lens element and the fourth lens element combined is f234, the focal length of the fifth lens element is f5, and they satisfy the relation: $1.0<f234/f5<2.0$. Appropriate refractive power is favorable to reduce the spherical aberration and astigmatism of the six-piece optical lens system with a wide field of view effectively.

Preferably, the focal length of the second lens element, the third lens element and the fourth lens element combined is f234, the focal length of the fifth lens element and the sixth lens element combined is f56, and they satisfy the relation: $0.8<f234/f56<1.4$. Appropriate refractive power is favorable to reduce the spherical aberration and astigmatism of the six-piece optical lens system with a wide field of view effectively.

Preferably, the focal length of the first lens element, the second lens element and the third lens element combined is f123, the focal length of the fourth lens element is f4, and they satisfy the relation: $-0.9<f123/f4<-0.5$. Appropriate refractive power is favorable to reduce the spherical aberration and astigmatism of the six-piece optical lens system with a wide field of view effectively.

Preferably, the focal length of the first lens element, the second lens element and the third lens element combined is f123, the focal length of the fourth lens element and the fifth lens element combined is f45, and they satisfy the relation: $0.05<f123/f45<0.4$. If f123/f45 satisfies the above relation, a wide field of view, high pixel and low height can be provided and the resolution can be improved evidently. Contrarily, if f123/f45 exceeds the above range, the performance and resolution of the six-piece optical lens system with a wide field of view will be reduced, and the yield rate will be low.

Preferably, the focal length of the first lens element, the second lens element and the third lens element combined is f123, a focal length of the fourth lens element, the fifth lens element and the sixth lens element combined is f456, and they satisfy the relation: $-0.5<f123/f456<-0.05$. If f123/f456 satisfies the above relation, a wide field of view, high pixel and low height can be provided and the resolution can be improved evidently. Contrarily, if f123/f456 exceeds the above range, the performance and resolution of the six-piece optical lens system with a wide field of view will be reduced, and the yield rate will be low.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
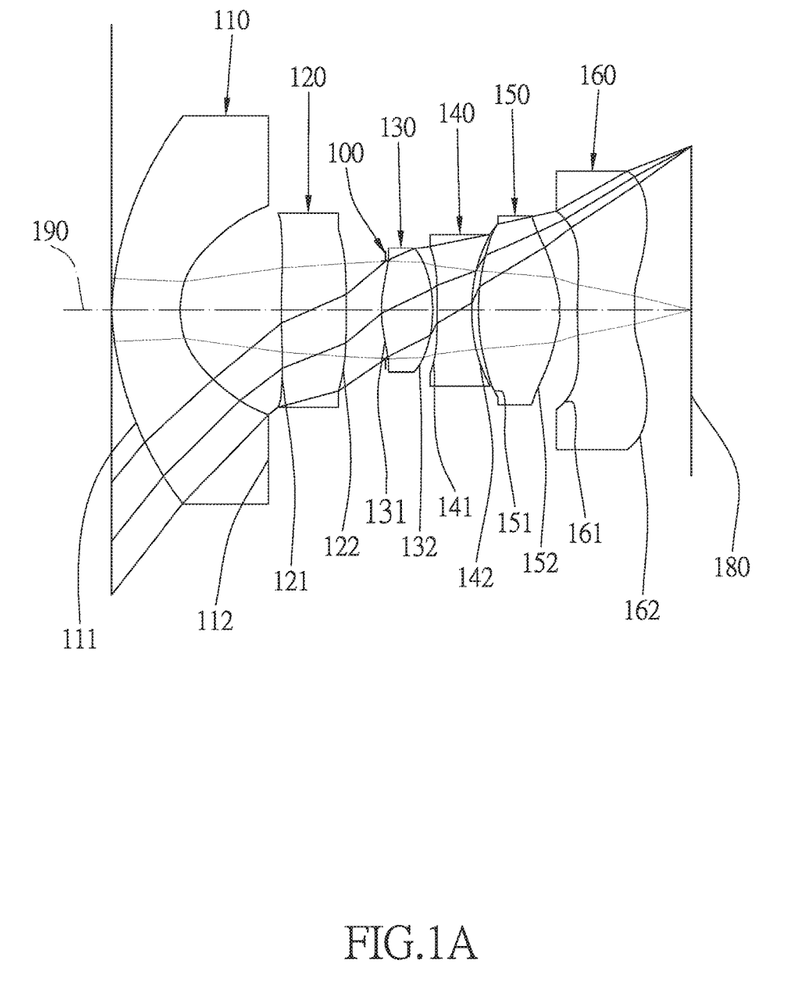
FIG. 1A shows an optical lens system with a wide field of view in accordance with a first embodiment of the present invention.
Figure 1B:
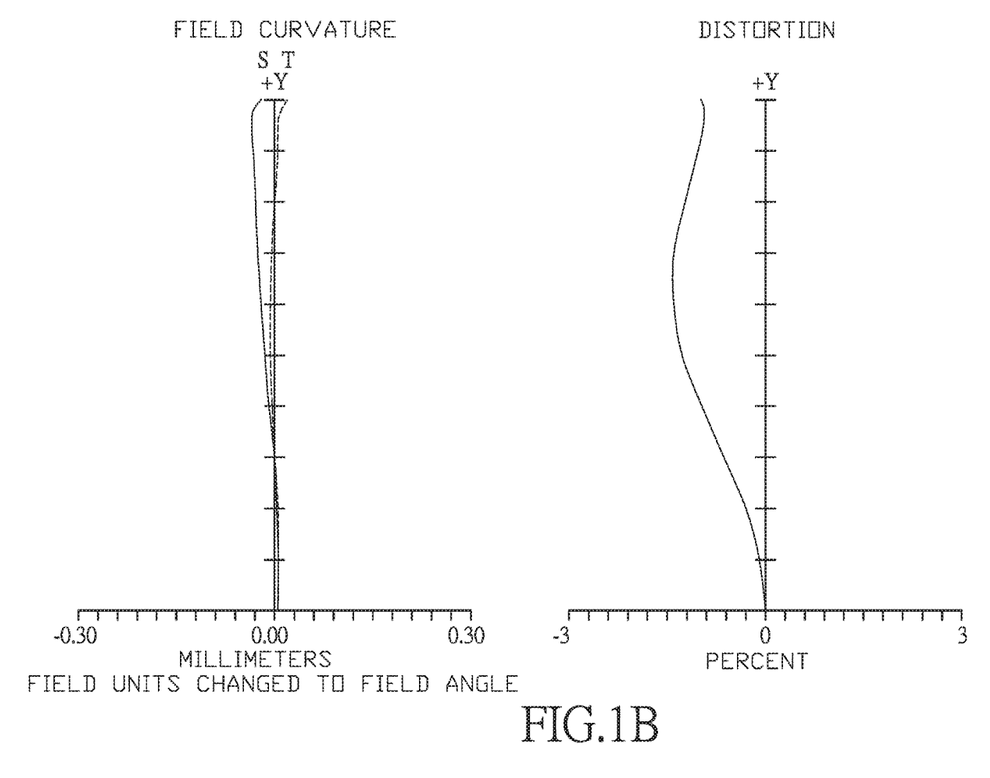
FIG. 1B shows the image plane curve and the distortion curve of the first embodiment of the present invention.

Referring to FIGS. 1A and 1B, FIG. 1A shows an optical lens system with a wide field of view in accordance with a first embodiment of the present invention, and FIG. 1B shows, in order from left to right, the image plane curve and the distortion curve of the first embodiment of the present invention. A six-piece optical lens system with a wide field of view in accordance with the first embodiment of the present invention comprises a stop 100 and a lens group. The lens group comprises, in order from an object side to an image side: a first lens element 110, a second lens element 120, a third lens element 130, a fourth lens element 140, a fifth lens element 150, a sixth lens element 160, and an image plane 180, wherein the six-piece optical lens system with a wide field of view has a total of six lens elements with refractive power. The stop 100 is disposed between an image-side surface 122 of the second lens element 120 and an image-side surface 132 of the third lens element 130.

The first lens element 110 with a negative refractive power has an object-side surface 111 being convex near an optical axis 190 and an image-side surface 112 being concave near the optical axis 190, the object-side surface 111 and the image-side surface 112 are aspheric, and the first lens element 110 is made of plastic material.

The second lens element 120 with a positive refractive power has an object-side surface 121 being convex near the optical axis 190 and the image-side surface 122 being convex near the optical axis 190, the object-side surface 121 and the image-side surface 122 are aspheric, and the second lens element 120 is made of plastic material.

The third lens element 130 with a positive refractive power has an object-side surface 131 being convex near the optical axis 190 and the image-side surface 132 being convex near the optical axis 190, the object-side surface 131 and the image-side surface 132 are aspheric, and the third lens element 130 is made of plastic material.

The fourth lens element 140 with a negative refractive power has an object-side surface 141 being concave near the optical axis 190 and an image-side surface 142 being concave near the optical axis 190, the object-side surface 141 and the image-side surface 142 are aspheric, and the fourth lens element 140 is made of plastic material.

The fifth lens element 150 with a positive refractive power has an object-side surface 151 being convex near the optical axis 190 and an image-side surface 152 being convex near the optical axis 190, the object-side surface 151 and the image-side surface 152 are aspheric, and the fifth lens element 150 is made of plastic material.

The fifth lens element 160 with a negative refractive power has an object-side surface 161 being convex near the optical axis 190 and an image-side surface 162 being concave near the optical axis 190, the object-side surface 161 and the image-side surface 162 are aspheric, the sixth lens element 160 is made of plastic material, and at least one of the object-side surface 161 and the image-side surface 162 is provided with at least one inflection point.

The equation for the aspheric surface profiles of the respective lens elements of the first embodiment is expressed as follows:

$$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, G, . . . : represent the high-order aspheric coefficients.

In the first embodiment of the present six-piece optical lens system with a wide field of view, a focal length of the six-piece optical lens system with a wide field of view is f, a f-number of the six-piece optical lens system with a wide field of view is Fno, the six-piece optical lens system with a wide field of view has a maximum view angle (field of view) FOV, and they satisfy the relations: f=1.924 mm; Fno=2.0; and FOV=103 degrees.

In the first embodiment of the present six-piece optical lens system with a wide field of view, a focal length of the first lens element 110 is f1, a focal length of the second lens element 120 is f2, and they satisfy the relation: f1/f2=−0.39.

In the first embodiment of the present six-piece optical lens system with a wide field of view, the focal length of the second lens element 120 is f2, a focal length of the third lens element 130 is f3, and they satisfy the relation: f2/f3=−4.49.

In the first embodiment of the present six-piece optical lens system with a wide field of view, the focal length of the third lens element 130 is f3, a focal length of the fourth lens element 140 is f4, and they satisfy the relation: f3/f4=−0.89.

In the first embodiment of the present six-piece optical lens system with a wide field of view, the focal length of the fourth lens element 140 is f4, a focal length of the fifth lens element 150 is f5, and they satisfy the relation: f4/f5=−1.05.

In the first embodiment of the present six-piece optical lens system with a wide field of view, the focal length of the fifth lens element 150 is f5, a focal length of the sixth lens element 160 is f6, and they satisfy the relation: f5/f6=−0.58.

In the first embodiment of the present six-piece optical lens system with a wide field of view, the focal length of the first lens element 110 is f1, the focal length of the third lens element 130 is f3, and they satisfy the relation: f1/f3=−1.73.

In the first embodiment of the present six-piece optical lens system with a wide field of view, the focal length of the second lens element 120 is f2, the focal length of the fourth lens element 140 is f4, and they satisfy the relation: f2/f4=−4.02.

In the first embodiment of the present six-piece optical lens system with a wide field of view, the focal length of the third lens element 130 is f3, the focal length of the fifth lens element 150 is f5, and they satisfy the relation: f3/f5=0.94.

In the first embodiment of the present six-piece optical lens system with a wide field of view, the focal length of the fourth lens element 140 is f4, the focal length of the sixth lens element 160 is f6, and they satisfy the relation: f4/f6=0.60.

In the first embodiment of the present six-piece optical lens system with a wide field of view, a focal length of the first lens element 110 and the second lens element 120 combined is f12, the focal length of the third lens element 130 is f3, and they satisfy the relation: f12/f3=−3.68.

In the first embodiment of the present six-piece optical lens system with a wide field of view, a focal length of the second lens element 120 and the third lens element 130 combined is f23, the focal length of the fourth lens element 140 is f4, and they satisfy the relation: f23/f4=−0.82.

In the first embodiment of the present six-piece optical lens system with a wide field of view, the focal length of the second lens element 120 and the third lens element 130 combined is f23, a focal length of the fourth lens element 140 and the fifth lens element 150 combined is f45, and they satisfy the relation: f23/f45=0.30.

In the first embodiment of the present six-piece optical lens system with a wide field of view, the focal length of the first lens element 110 and the second lens element 120 combined is f12, a focal length of the third lens element 130 and the fourth lens element 140 combined is f34, and they satisfy the relation: f12/f34=−1.29.

In the first embodiment of the present six-piece optical lens system with a wide field of view, the focal length of the third lens element 130 and the fourth lens element 140 combined is f34, a focal length of the fifth lens element 150 and the sixth lens element 160 combined is f56, and they satisfy the relation: f34/f56=2.05.

In the first embodiment of the present six-piece optical lens system with a wide field of view, the focal length of the fourth lens element 140 and the fifth lens element 150 combined is f45, the focal length of the sixth lens element 160 is f6, and they satisfy the relation: f45/f6=−1.64.

In the first embodiment of the present six-piece optical lens system with a wide field of view, the focal length of the first lens element 110 is f1, a focal length of the second lens element 120, the third lens element 130 and the fourth lens element 140 combined is f234, and they satisfy the relation: f1/f234=−1.01.

In the first embodiment of the present six-piece optical lens system with a wide field of view, the focal length of the second lens element 120, the third lens element 130 and the fourth lens element 140 combined is f234, the focal length of the fifth lens element 150 is f5, and they satisfy the relation: f234/f5=1.62.

In the first embodiment of the present six-piece optical lens system with a wide field of view, the focal length of the second lens element 120, the third lens element 130 and the fourth lens element 140 combined is f234, the focal length of the fifth lens element 150 and the sixth lens element 160 combined is f56, and they satisfy the relation: f234/f56=1.23.

In the first embodiment of the present six-piece optical lens system with a wide field of view, a focal length of the first lens element 110, the second lens element 120 and the third lens element 130 combined is f123, the focal length of the fourth lens element 140 is f4, and they satisfy the relation: f123/f4=−0.71.

In the first embodiment of the present six-piece optical lens system with a wide field of view, the focal length of the first lens element 110, the second lens element 120 and the third lens element 130 combined is f123, the focal length of the fourth lens element 140 and the fifth lens element 150 combined is f45, and they satisfy the relation: f123/f45=0.26.

In the first embodiment of the present six-piece optical lens system with a wide field of view, the focal length of the first lens element 110, the second lens element 120 and the third lens element 130 combined is f123, a focal length of the fourth lens element 140, the fifth lens element 150 and the sixth lens element 160 combined is f456, and they satisfy the relation: f123/f456=−0.21.

In the first embodiment of the present six-piece optical lens system with a wide field of view, an Abbe number of the third lens element 130 is V3, an Abbe number of the fourth lens element 140 is V4, and they satisfy the relation: V3−V4=32.1.

In the first embodiment of the present six-piece optical lens system with a wide field of view, an Abbe number of the fifth lens element 150 is V5, an Abbe number of the sixth lens element 160 is V6, and they satisfy the relation: V5−V6=32.1.

In the first embodiment of the present six-piece optical lens system with a wide field of view, a focal length of the six-piece optical lens system with a wide field of view is f, a distance from the object-side surface 111 of the first lens element 110 to the image plane 180 along the optical axis 190 is TL, and they satisfy the relation: f/TL=0.23.

The detailed optical data of the first embodiment is shown in table 1, and the aspheric surface data is shown in table 2.

TABLE 1

Embodiment 1
f(focal length) = 1.924 mm, Fno = 2.0, FOV = 103 deg.

| surface | | Curvature Radius | | Thickness | Material | Index | Abbe # | Focal length |
|---|---|---|---|---|---|---|---|---|
| 0 | object | infinity | | 600 | | | | |
| 1 | | infinity | | 0 | | | | |
| 2 | Lens 1 | 3.602 | (ASP) | 0.997 | plastic | 1.535 | 56.0 | −3.558 |
| 3 | | 1.128 | (ASP) | 1.487 | | | | |
| 4 | Lens 2 | 8.536 | (ASP) | 0.948 | plastic | 1.635 | 23.9 | 9.228 |
| 5 | | −18.448 | (ASP) | 0.569 | | | | |
| 6 | stop | infinity | | −0.051 | | | | |
| 7 | Lens 3 | 2.284 | (ASP) | 0.752 | plastic | 1.535 | 56.0 | 2.053 |
| 8 | | −1.887 | (ASP) | 0.067 | | | | |
| 9 | Lens 4 | −10.374 | (ASP) | 0.499 | plastic | 1.635 | 23.9 | −2.297 |
| 10 | | 1.749 | (ASP) | 0.102 | | | | |
| 11 | Lens 5 | 3.059 | (ASP) | 1.181 | plastic | 1.535 | 56.0 | 2.185 |
| 12 | | −1.647 | (ASP) | 0.267 | | | | |

TABLE 1-continued

Embodiment 1
f(focal length) = 1.924 mm, Fno = 2.0, FOV = 103 deg.

| surface | | Curvature Radius | | Thickness | Material | Index | Abbe # | Focal length |
|---|---|---|---|---|---|---|---|---|
| 13 | Lens 6 | 6.994 | (ASP) | 0.830 | plastic | 1.635 | 23.9 | −3.798 |
| 14 | | 1.722 | (ASP) | 0.837 | | | | |
| 15 | Image plane | infinity | | infinity | | | | |

TABLE 2

| | Aspheric Coefficients | | | | | |
|---|---|---|---|---|---|---|
| surface | 2 | 3 | 4 | 5 | 7 | 8 |
| K: | −3.8183E+00 | −7.8124E−01 | −2.9968E+01 | 7.6186E+01 | −4.4309E+00 | 1.8221E+00 |
| A: | 2.2103E−03 | 8.7666E−03 | −2.7350E−02 | −5.1268E−02 | −5.8063E−03 | 9.0986E−02 |
| B: | 2.0892E−04 | 3.7065E−03 | −1.4394E−02 | 1.2007E−02 | −3.0707E−02 | −1.2216E−01 |
| C: | −9.9356E−06 | 1.0233E−03 | 7.1462E−03 | 7.4042E−04 | 5.7394E−03 | 3.7606E−02 |
| D: | −2.3417E−07 | −2.0247E−04 | −9.4280E−04 | −2.3212E−04 | −1.1363E−01 | −2.1594E−02 |
| surface | 9 | 10 | 11 | 12 | 13 | 14 |
| K: | 3.0544E+01 | −9.4289E+00 | −1.7273E+00 | −2.7736E+00 | −1.8717E+02 | −9.1363E+00 |
| A: | −9.2739E−02 | 2.1290E−02 | −7.7675E−03 | 1.7242E−02 | −4.6913E−02 | −3.9966E−02 |
| B: | 8.3309E−02 | 2.6802E−03 | 1.2635E−02 | 3.0183E−03 | −1.3864E−02 | 3.8393E−03 |
| C: | −1.6525E−01 | 1.9547E−03 | −2.0405E−03 | −8.1547E−03 | 2.4192E−03 | −1.0338E−03 |
| D: | 1.0811E−01 | 4.5367E−05 | 4.6954E−04 | 3.6294E−03 | −2.1398E−03 | 8.5276E−05 |

The units of the radius of curvature, the thickness and the focal length in table 1 are expressed in mm, the surface numbers 0-15 represent the surfaces sequentially arranged from the object-side to the image-side along the optical axis. In table 2, k represents the conic coefficient of the equation of the aspheric surface profiles, and A, B, C, D . . . : represent the high-order aspheric coefficients. The tables presented below for each embodiment are the corresponding schematic parameter and image plane curves, and the definitions of the tables are the same as Table 1 and Table 2 of the first embodiment. Therefore, an explanation in this regard will not be provided again.

Figure 2A:
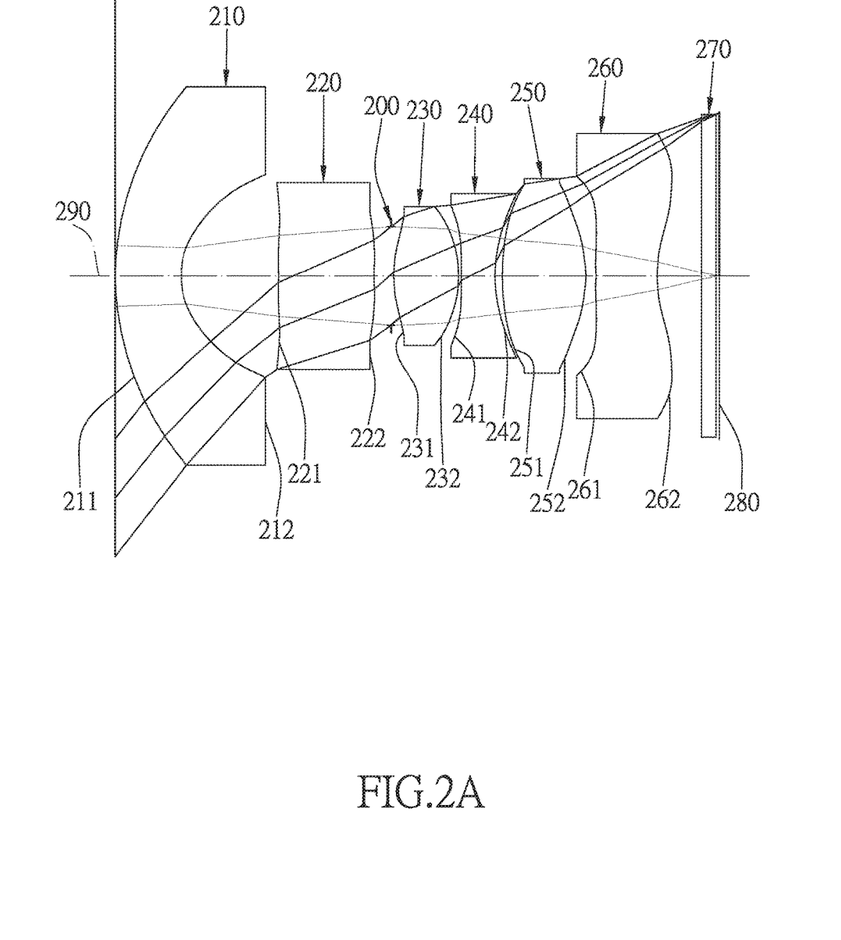
FIG. 2A shows an optical lens system with a wide field of view in accordance with a second embodiment of the present invention.
Figure 2B:
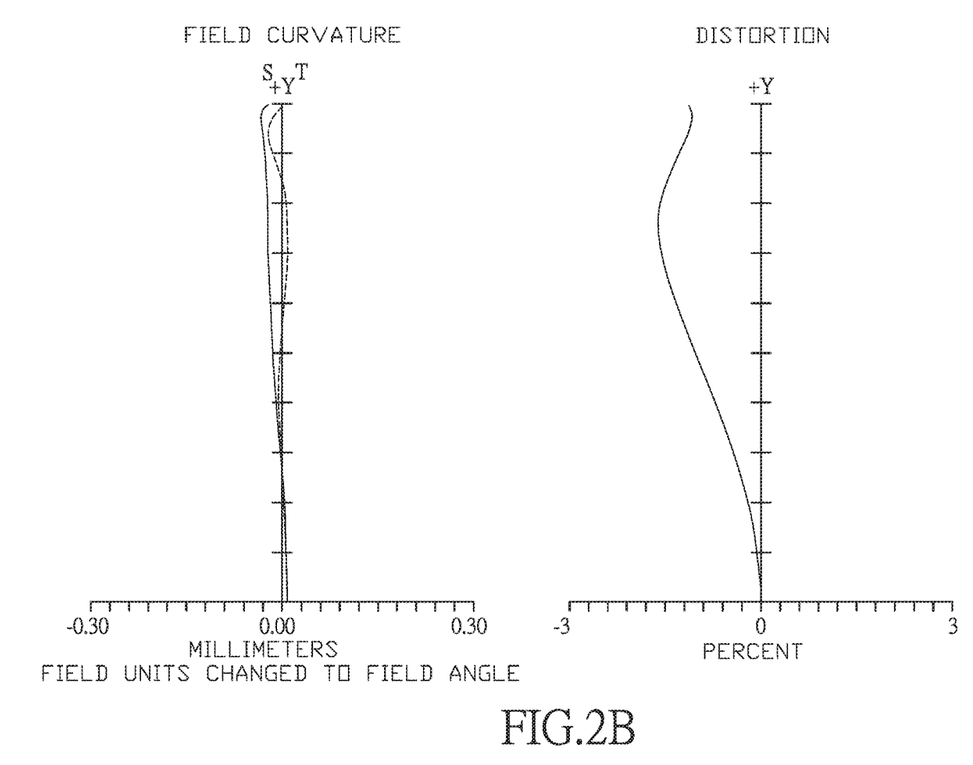
FIG. 2B shows the image plane curve and the distortion curve of the second embodiment of the present invention.

Referring to FIGS. 2A and 2B, FIG. 2A shows an optical lens system with a wide field of view in accordance with a second embodiment of the present invention, and FIG. 2B shows, in order from left to right, the image plane curve and the distortion curve of the second embodiment of the present invention. A six-piece optical lens system with a wide field of view in accordance with the second embodiment of the present invention comprises a stop 200 and a lens group. The lens group comprises, in order from an object side to an image side: a first lens element 210, a second lens element 220, a third lens element 230, a fourth lens element 240, a fifth lens element 250, a sixth lens element 260, a visible wavelength and infrared single wavelength cut filter 270, and an image plane 280, wherein the six-piece optical lens system with a wide field of view has a total of six lens elements with refractive power. The stop 200 is disposed between an image-side surface 222 of the first lens element 220 and an image-side surface 232 of the third lens element 230.

The first lens element 210 with a negative refractive power has an object-side surface 211 being convex near an optical axis 290 and the image-side surface 212 being concave near the optical axis 290, the object-side surface 211 and an image-side surface 212 are aspheric, and the first lens element 210 is made of plastic material.

The second lens element 220 with a positive refractive power has an object-side surface 221 being convex near the optical axis 290 and the image-side surface 222 being convex near the optical axis 290, the object-side surface 221 and the image-side surface 222 are aspheric, and the second lens element 220 is made of plastic material.

The third lens element 230 with a positive refractive power has an object-side surface 231 being convex near the optical axis 290 and the image-side surface 232 being convex near the optical axis 290, the object-side surface 231 and the image-side surface 232 are aspheric, and the third lens element 230 is made of plastic material.

The fourth lens element 240 with a negative refractive power has an object-side surface 241 being concave near the optical axis 290 and an image-side surface 242 being concave near the optical axis 290, the object-side surface 241 and the image-side surface 242 are aspheric, and the fourth lens element 240 is made of plastic material.

The fifth lens element 250 with a positive refractive power has an object-side surface 251 being convex near the optical axis 290 and an image-side surface 252 being convex near the optical axis 290, the object-side surface 251 and the image-side surface 252 are aspheric, and the fifth lens element 250 is made of plastic material.

The fifth lens element 260 with a negative refractive power has an object-side surface 261 being convex near the optical axis 290 and an image-side surface 262 being concave near the optical axis 290, the object-side surface 261 and the image-side surface 262 are aspheric, the sixth lens element 260 is made of plastic material, and at least one of the object-side surface 261 and the image-side surface 262 is provided with at least one inflection point.

The visible wavelength and infrared single wavelength cut filter 270 made of glass is located between the sixth lens element 260 and the image plane 280 and has no influence on the focal length of the six-piece optical lens system with a wide field of view.

The detailed optical data of the second embodiment is shown in table 3, and the aspheric surface data is shown in table 4.

| Embodiment 2 | |
| --- | --- |
| f[mm] | 1.928 |
| Fno | 2.0 |
| FOV[deg.] | 103 |
| f1/f2 | −0.29 |
| f2/f3 | 6.57 |

TABLE 3

Embodiment 2
f(focal length) = 1.928 mm, Fno = 2.0, FOV = 103 deg.

| surface | | Curvature Radius | | Thickness | Material | Index | Abbe # | Focal length |
| --- | --- | --- | --- | --- | --- | --- | --- | --- |
| 0 | object | infinity | | 600 | | | | |
| 1 | | infinity | | 0 | | | | |
| 2 | Lens 1 | 3.568 | (ASP) | 0.983 | plastic | 1.535 | 56.0 | −3.595 |
| 3 | | 1.132 | (ASP) | 1.434 | | | | |
| 4 | Lens 2 | 12.058 | (ASP) | 1.409 | plastic | 1.635 | 23.9 | 12.454 |
| 5 | | −22.558 | (ASP) | 0.240 | | | | |
| 6 | stop | infinity | | 0.049 | | | | |
| 7 | Lens 3 | 2.005 | (ASP) | 0.957 | plastic | 1.535 | 56.0 | 1.896 |
| 8 | | −1.724 | (ASP) | 0.048 | | | | |
| 9 | Lens 4 | −8.844 | (ASP) | 0.490 | plastic | 1.635 | 23.9 | −2.209 |
| 10 | | 1.723 | (ASP) | 0.105 | | | | |
| 11 | Lens 5 | 3.217 | (ASP) | 1.236 | plastic | 1.535 | 56.0 | 2.354 |
| 12 | | −1.804 | (ASP) | 0.138 | | | | |
| 13 | Lens 6 | 6.800 | (ASP) | 0.921 | plastic | 1.635 | 23.9 | −4.069 |
| 14 | | 1.786 | (ASP) | 0.645 | | | | |
| 15 | visible wavelength and infrared single wavelength cut filter | infinity | | 0.210 | glass | 1.517 | 64.167 | — |
| 16 | | infinity | | 0.050 | | | | |
| 17 | Image plane | infinity | | infinity | | | | |

TABLE 4

Aspheric Coefficients

| surface | 2 | 3 | 4 | 5 | 7 | 8 |
| --- | --- | --- | --- | --- | --- | --- |
| K: | −4.0623E+00 | −8.0139E−01 | −1.0015E+02 | 2.6590E+02 | −5.7989E+00 | 4.5497E−01 |
| A: | 2.5439E−03 | 5.3151E−03 | −2.4552E−02 | −8.2677E−02 | −1.0647E−02 | 5.1408E−02 |
| B: | 2.8125E−04 | 6.4455E−03 | −9.2819E−03 | 5.1320E−02 | 1.4142E−02 | −6.5644E−02 |
| C: | −1.8449E−06 | 6.1803E−04 | 4.8989E−03 | −9.4382E−03 | −4.9346E−02 | 1.4055E−02 |
| D: | −4.4109E−07 | 2.5085E−04 | −4.5972E−04 | 7.7741E−04 | 4.8541E−03 | 1.4406E−03 |

| surface | 9 | 10 | 11 | 12 | 13 | 14 |
| --- | --- | --- | --- | --- | --- | --- |
| K: | 5.7100E+01 | −9.4631E+00 | −5.9344E−01 | −2.9769E+00 | −1.0145E+02 | −6.8808E+00 |
| A: | −1.1581E−01 | 2.0528E−02 | −6.3030E−03 | 1.3950E−02 | −4.4379E−02 | −4.1112E−02 |
| B: | 9.5436E−02 | 5.6325E−03 | 1.0963E−02 | −4.4542E−04 | −1.6166E−02 | 4.9707E−03 |
| C: | −1.0448E−01 | −1.7329E−03 | −2.4302E−03 | −8.2348E−03 | 3.6676E−03 | −8.2197E−04 |
| D: | 5.9154E−02 | 3.5443E−04 | 6.4237E−04 | 4.1158E−03 | −1.5911E−03 | 4.0465E−05 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

-continued

| Embodiment 2 | |
| --- | --- |
| f3/f4 | −0.86 |
| f4/f5 | −0.94 |
| f5/f6 | −0.58 |
| f1/f3 | −1.90 |
| f2/f4 | −5.64 |
| f3/f5 | 0.81 |

-continued

Embodiment 2

| | |
|---|---|
| f4/f6 | 0.54 |
| f12/f3 | −3.16 |
| f23/f4 | −0.81 |
| f23/f45 | 0.20 |
| f12/f34 | −1.32 |
| f34/f56 | 1.42 |
| f45/f6 | −2.24 |
| f1/f234 | −1.08 |
| f234/f5 | 1.41 |
| f234/f56 | 1.04 |
| f123/f4 | −0.67 |
| f123/f45 | 0.16 |
| f123/f456 | −0.27 |
| V3-V4 | 32.1 |
| V5-V6 | 32.1 |
| f/TL | 0.22 |

Figure 3A:
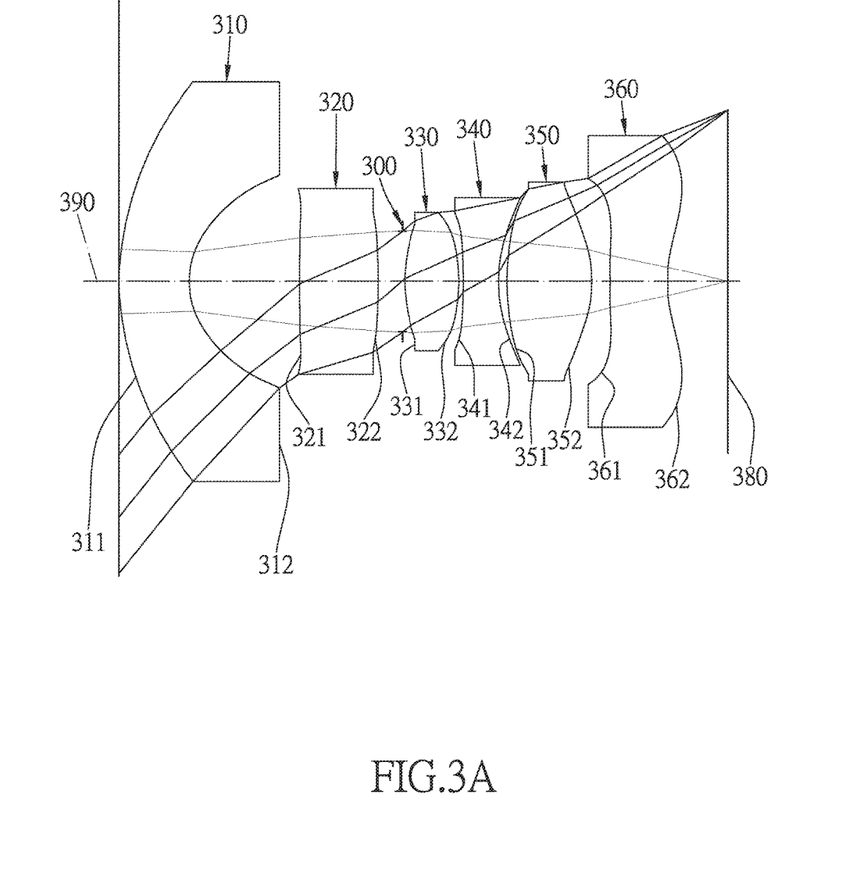
FIG. 3A shows an optical lens system with a wide field of view in accordance with a third embodiment of the present invention.
Figure 3B:
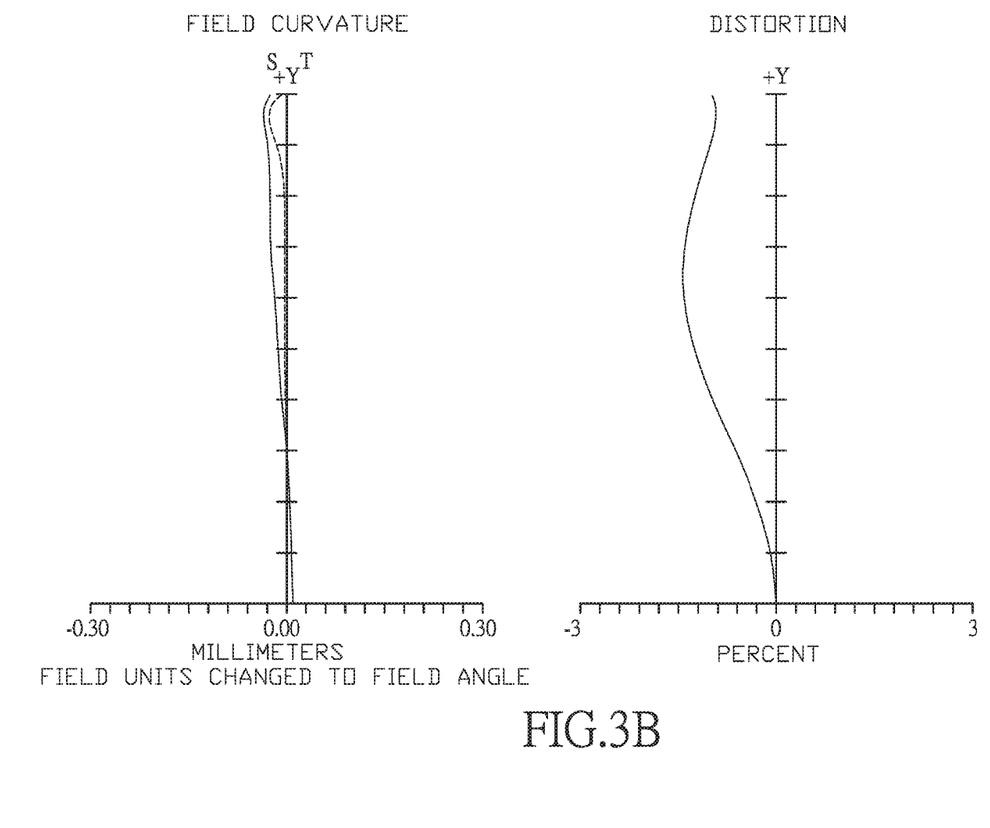
FIG. 3B shows the image plane curve and the distortion curve of the third embodiment of the present invention.

Referring to FIGS. 3A and 3B, FIG. 3A shows an optical lens system with a wide field of view in accordance with a third embodiment of the present invention, and FIG. 3B shows, in order from left to right, the image plane curve and the distortion curve of the third embodiment of the present invention. A six-piece optical lens system with a wide field of view in accordance with the third embodiment of the present invention comprises a stop 300 and a lens group. The lens group comprises, in order from an object side to an image side: a first lens element 310, a second lens element 320, a third lens element 330, a fourth lens element 340, a fifth lens element 350, a sixth lens element 360, and an image plane 380, wherein the six-piece optical lens system with a wide field of view has a total of six lens elements with refractive power. The stop 300 is disposed between an image-side surface 322 of the second lens element 320 and an image-side surface 332 of the third lens element 330.

The first lens element 310 with a negative refractive power has an object-side surface 311 being convex near an optical axis 390 and an image-side surface 312 being concave near the optical axis 390, the object-side surface 311 and the image-side surface 312 are aspheric, and the first lens element 310 is made of plastic material.

The second lens element 320 with a positive refractive power has an object-side surface 321 being convex near the optical axis 390 and the image-side surface 322 being convex near the optical axis 390, the object-side surface 321 and the image-side surface 322 are aspheric, and the second lens element 320 is made of plastic material.

The third lens element 330 with a positive refractive power has an object-side surface 331 being convex near the optical axis 390 and the image-side surface 332 being convex near the optical axis 390, the object-side surface 331 and the image-side surface 332 are aspheric, and the third lens element 330 is made of plastic material.

The fourth lens element 340 with a negative refractive power has an object-side surface 341 being concave near the optical axis 390 and an image-side surface 342 being concave near the optical axis 390, the object-side surface 341 and the image-side surface 342 are aspheric, and the fourth lens element 340 is made of plastic material.

The fifth lens element 350 with a positive refractive power has an object-side surface 351 being convex near the optical axis 390 and an image-side surface 352 being convex near the optical axis 390, the object-side surface 351 and the image-side surface 352 are aspheric, and the fifth lens element 350 is made of plastic material.

The fifth lens element 360 with a negative refractive power has an object-side surface 361 being convex near the optical axis 390 and an image-side surface 362 being concave near the optical axis 390, the object-side surface 361 and the image-side surface 362 are aspheric, the sixth lens element 360 is made of plastic material, and the object-side surface 361 and the image-side surface 362 are provided with more than one inflection point, respectively.

The detailed optical data of the third embodiment is shown in table 5, and the aspheric surface data is shown in table 6.

TABLE 5

Embodiment 3
f(focal length) = 1.926 mm, Fno = 2.0, FOV = 103 deg.

| surface | | Curvature Radius | | Thickness | Material | Index | Abbe # | Focal length |
|---|---|---|---|---|---|---|---|---|
| 0 | object | infinity | | 600 | | | | |
| 1 | | infinity | | 0 | | | | |
| 2 | Lens 1 | 3.512 | (ASP) | 0.994 | plastic | 1.535 | 56.0 | −3.576 |
| 3 | | 1.119 | (ASP) | 1.542 | | | | |
| 4 | Lens 2 | 8.624 | (ASP) | 1.103 | plastic | 1.635 | 23.9 | 9.161 |
| 5 | | −17.497 | (ASP) | 0.339 | | | | |
| 6 | stop | infinity | | 0.049 | | | | |
| 7 | Lens 3 | 2.211 | (ASP) | 0.756 | plastic | 1.535 | 56.0 | 2.064 |
| 8 | | −1.958 | (ASP) | 0.060 | | | | |
| 9 | Lens 4 | −12.887 | (ASP) | 0.495 | plastic | 1.635 | 23.9 | −2.294 |
| 10 | | 1.685 | (ASP) | 0.099 | | | | |
| 11 | Lens 5 | 3.057 | (ASP) | 1.203 | plastic | 1.535 | 56.0 | 2.182 |
| 12 | | −1.639 | (ASP) | 0.258 | | | | |
| 13 | Lens 6 | 7.299 | (ASP) | 0.812 | plastic | 1.635 | 23.9 | −3.771 |
| 14 | | 1.737 | (ASP) | 0.840 | | | | |
| 15 | Image plane | infinity | | infinity | | | | |

TABLE 6

Aspheric Coefficients

| surface | 2 | 3 | 4 | 5 | 7 | 8 |
|---|---|---|---|---|---|---|
| K: | −3.9163E+00 | −7.7953E−01 | −3.3710E+01 | 1.5034E+02 | −3.5854E+00 | 1.5027E+00 |
| A: | 2.4159E−03 | 7.0235E−03 | −2.7294E−02 | −5.5356E−02 | −4.0946E−03 | 9.7360E−02 |
| B: | 2.3993E−04 | 4.6891E−03 | −1.3828E−02 | 1.7119E−02 | −1.7559E−03 | −1.1997E−01 |
| C: | 9.9379E−06 | 1.1259E−03 | 6.6798E−03 | 4.8262E−03 | −1.5046E−02 | 3.6285E−02 |
| D: | 2.2699E−07 | 6.3104E−05 | −7.2415E−04 | −1.5059E−03 | −4.4192E−02 | −1.5209E−02 |

| surface | 9 | 10 | 11 | 12 | 13 | 14 |
|---|---|---|---|---|---|---|
| K: | 1.0386E+02 | −9.1221E+00 | −1.0687E+00 | −2.8101E+00 | −1.8193E+02 | −8.6632E+00 |
| A: | −1.0592E−01 | 1.8016E−02 | −6.6417E−03 | 1.7645E−02 | −4.6053E−02 | −4.0609E−02 |
| B: | 8.5799E−02 | 1.0094E−03 | 1.3542E−02 | 2.9788E−03 | −1.5228E−02 | 4.2452E−03 |
| C: | −1.6145E−01 | 1.1309E−03 | −4.3853E−03 | −8.6737E−03 | 2.9250E−03 | −1.1019E−03 |
| D: | 9.7064E−02 | 2.7044E−04 | 1.2110E−03 | 4.0752E−03 | −2.1968E−03 | 9.2207E−05 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | |
|---|---|
| f[mm] | 1.926 |
| Fno | 2.0 |
| FOV[deg.] | 103 |
| f1/f2 | −0.39 |
| f2/f3 | 4.44 |
| f3/f4 | −0.90 |
| f4/f5 | −1.05 |
| f5/f6 | −0.58 |
| f1/f3 | −1.73 |
| f2/f4 | −3.99 |
| f3/f5 | 0.95 |
| f4/f6 | 0.61 |
| f12/f3 | −3.81 |
| f23/f4 | −0.82 |
| f23/f45 | 0.30 |
| f12/f34 | −1.33 |
| f34/f56 | 2.04 |
| f45/f6 | −1.65 |
| f1/f234 | −1.02 |
| f234/f5 | 1.61 |
| f234/f56 | 1.21 |
| f123/f4 | −0.71 |
| f123/f45 | 0.26 |
| f123/f456 | −0.21 |
| V3-V4 | 32.1 |
| V5-V6 | 32.1 |
| f/TL | 0.23 |

Figure 4A:
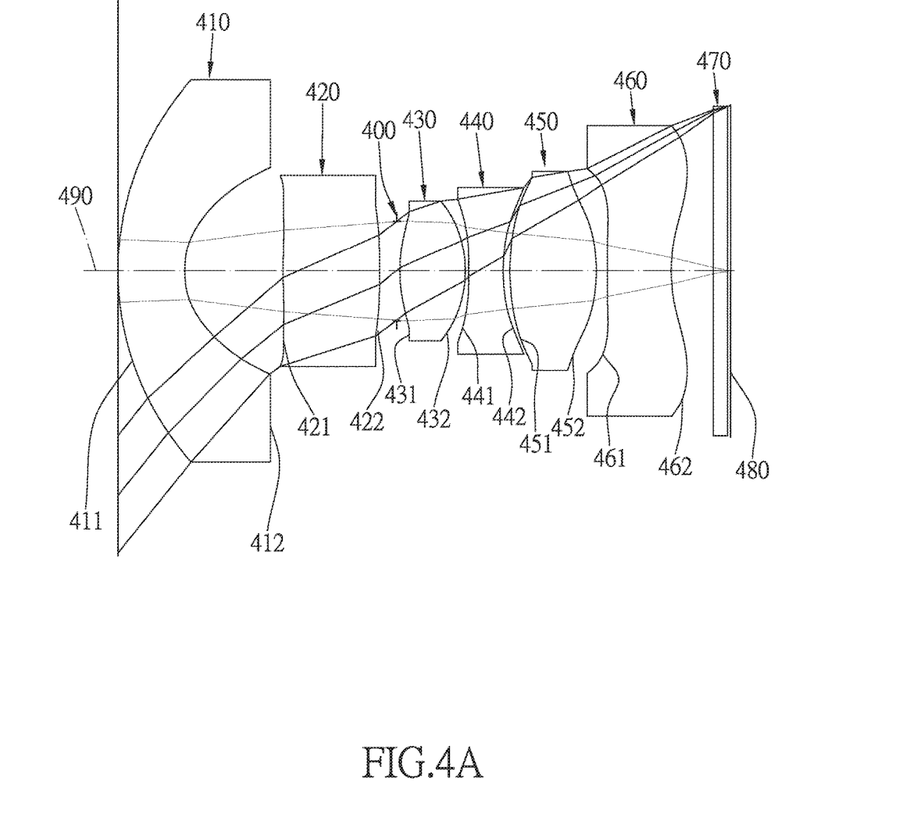
FIG. 4A shows an optical lens system with a wide field of view in accordance with a fourth embodiment of the present invention.
Figure 4B:
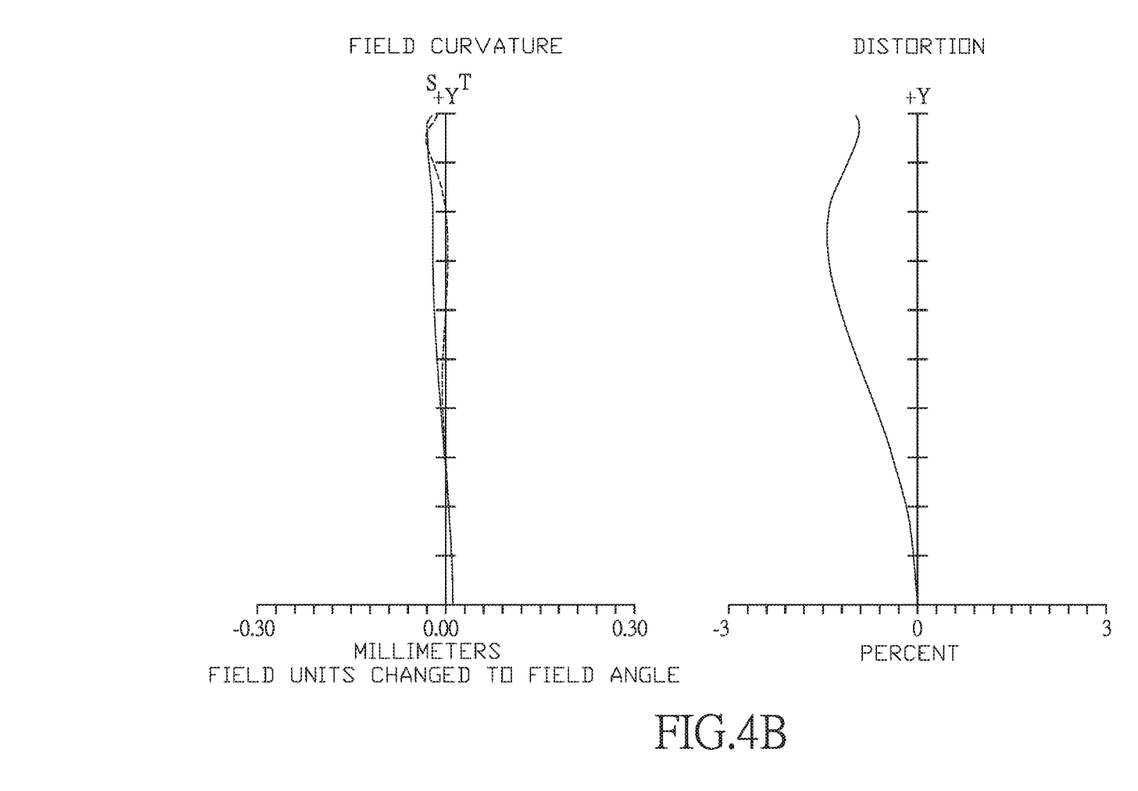
FIG. 4B shows the image plane curve and the distortion curve of the fourth embodiment of the present invention.

Referring to FIGS. 4A and 4B, FIG. 4A shows an optical lens system with a wide field of view in accordance with a fourth embodiment of the present invention, and FIG. 4B shows, in order from left to right, the image plane curve and the distortion curve of the fourth embodiment of the present invention. A six-piece optical lens system with a wide field of view in accordance with the fourth embodiment of the present invention comprises a stop 400 and a lens group. The lens group comprises, in order from an object side to an image side: a first lens element 410, a second lens element 420, a third lens element 430, a fourth lens element 440, a fifth lens element 450, a sixth lens element 460, a visible wavelength and infrared single wavelength cut filter 470, and an image plane 480, wherein the six-piece optical lens system with a wide field of view has a total of six lens elements with refractive power. The stop 400 is disposed between an image-side surface 422 of the first lens element 420 and an image-side surface 432 of the third lens element 430.

The first lens element 410 with a negative refractive power has an object-side surface 411 being convex near an optical axis 490 and the image-side surface 412 being concave near the optical axis 490, the object-side surface 411 and an image-side surface 412 are aspheric, and the first lens element 410 is made of plastic material.

The second lens element 420 with a positive refractive power has an object-side surface 421 being convex near the optical axis 490 and the image-side surface 422 being convex near the optical axis 490, the object-side surface 421 and the image-side surface 422 are aspheric, and the second lens element 420 is made of plastic material.

The third lens element 430 with a positive refractive power has an object-side surface 431 being convex near the optical axis 490 and the image-side surface 432 being convex near the optical axis 490, the object-side surface 431 and the image-side surface 432 are aspheric, and the third lens element 430 is made of plastic material.

The fourth lens element 440 with a negative refractive power has an object-side surface 441 being concave near the optical axis 490 and an image-side surface 442 being concave near the optical axis 490, the object-side surface 441 and the image-side surface 442 are aspheric, and the fourth lens element 440 is made of plastic material.

The fifth lens element 450 with a positive refractive power has an object-side surface 451 being convex near the optical axis 490 and an image-side surface 452 being convex near the optical axis 490, the object-side surface 451 and the image-side surface 452 are aspheric, and the fifth lens element 450 is made of plastic material.

The fifth lens element 460 with a negative refractive power has an object-side surface 461 being convex near the optical axis 490 and an image-side surface 462 being concave near the optical axis 490, the object-side surface 461 and the image-side surface 462 are aspheric, the sixth lens element 460 is made of plastic material, and the object-side surface 461 and the image-side surface 462 are provided with more than one inflection point, respectively.

The visible wavelength and infrared single wavelength cut filter 470 made of glass is located between the sixth lens element 460 and the image plane 480 and has no influence on the focal length of the six-piece optical lens system with a wide field of view.

The detailed optical data of the fourth embodiment is shown in table 7, and the aspheric surface data is shown in table 8.

TABLE 7

Embodiment 4
f(focal length) = 1.928 mm, Fno = 2.0, FOV = 103 deg.

| surface | | Curvature Radius | | Thickness | Material | Index | Abbe # | Focal length |
|---|---|---|---|---|---|---|---|---|
| 0 | object | infinity | | 600 | | | | |
| 1 | | infinity | | 0 | | | | |
| 2 | Lens 1 | 3.572 | (ASP) | 0.974 | plastic | 1.535 | 56.0 | −3.602 |
| 3 | | 1.135 | (ASP) | 1.430 | | | | |
| 4 | Lens 2 | 11.783 | (ASP) | 1.393 | plastic | 1.635 | 23.9 | 11.830 |
| 5 | | −20.305 | (ASP) | 0.250 | | | | |
| 6 | stop | infinity | | 0.049 | | | | |
| 7 | Lens 3 | 2.058 | (ASP) | 0.952 | plastic | 1.535 | 56.0 | 1.901 |
| 8 | | −1.699 | (ASP) | 0.048 | | | | |
| 9 | Lens 4 | −8.911 | (ASP) | 0.487 | plastic | 1.635 | 23.9 | −2.211 |
| 10 | | 1.722 | (ASP) | 0.110 | | | | |
| 11 | Lens 5 | 3.216 | (ASP) | 1.251 | plastic | 1.535 | 56.0 | 2.361 |
| 12 | | −1.809 | (ASP) | 0.152 | | | | |
| 13 | Lens 6 | 6.854 | (ASP) | 0.919 | plastic | 1.635 | 23.9 | −4.020 |
| 14 | | 1.775 | (ASP) | 0.619 | | | | |
| 15 | visible wavelength and infrared single wavelength cut filter | infinity | | 0.210 | glass | 1.517 | 64.167 | — |
| 16 | | infinity | | 0.050 | | | | |
| 17 | Image plane | infinity | | infinity | | | | |

TABLE 8

Aspheric Coefficients

| surface | 2 | 3 | 4 | 5 | 7 | 8 |
|---|---|---|---|---|---|---|
| K: | −4.0343E+00 | −7.9764E−01 | −9.1353E+01 | 1.9359E+02 | −5.9527E+00 | 4.5848E−01 |
| A: | 2.5710E−03 | 5.4783E−03 | −2.4120E−02 | −8.0090E−02 | −1.1428E−02 | 5.3098E−02 |
| B: | 2.8423E−04 | 6.6850E−03 | −9.3332E−03 | 4.8411E−02 | 1.0645E−02 | −6.6241E−02 |
| C: | 1.8453E−06 | 5.8629E−04 | 4.4933E−03 | −1.0213E−02 | −4.7010E−02 | 1.5815E−02 |
| D: | 4.5036E−07 | 2.5877E−04 | −3.1846E−04 | 2.1887E−03 | 2.4701E−03 | 1.5983E−03 |

| surface | 9 | 10 | 11 | 12 | 13 | 14 |
|---|---|---|---|---|---|---|
| K: | 5.8894E+01 | −9.4130E+00 | −8.0747E−01 | −2.8130E+00 | −9.4808E+01 | −6.3851E+00 |
| A: | −1.1801E−01 | 1.9848E−02 | −6.3097E−03 | 1.3167E−02 | −4.4008E−02 | −3.9461E−02 |
| B: | 9.5700E−02 | 4.7669E−03 | 1.1516E−02 | −6.6287E−04 | −1.6133E−02 | 4.8178E−03 |
| C: | −1.0347E−01 | −1.6044E−03 | −2.6958E−03 | −8.2881E−03 | 3.6841E−03 | −8.6117E−04 |
| D: | 6.0192E−02 | 3.5338E−04 | 6.7575E−04 | 4.1668E−03 | −1.6409E−03 | 4.5404E−05 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | |
|---|---|
| f[mm] | 1.928 |
| Fno | 2.0 |
| FOV[deg.] | 103 |
| f1/f2 | −0.30 |
| f2/f3 | 6.22 |
| f3/f4 | −0.86 |
| f4/f5 | −0.94 |
| f5/f6 | −0.59 |
| f1/f3 | −1.89 |
| f2/f4 | −5.35 |
| f3/f5 | 0.81 |
| f4/f6 | 0.55 |
| f12/f3 | −3.28 |
| f23/f4 | −0.81 |
| f23/f45 | 0.20 |
| f12/f34 | −1.35 |
| f34/f56 | 1.43 |
| f45/f6 | −2.25 |
| f1/f234 | −1.09 |
| f234/f5 | 1.40 |
| f234/f56 | 1.03 |
| f123/f4 | −0.67 |
| f123/f45 | 0.16 |
| f123/f456 | −0.27 |

-continued

Embodiment 4

| | |
|---|---|
| V3-V4 | 32.1 |
| V5-V6 | 32.1 |
| f/TL | 0.22 |

In the present optical lens system with a wide field of view, the lens elements can be made of plastic or glass. If the lens elements are made of plastic, the cost will be effectively reduced. If the lens elements are made of glass, there is more freedom in distributing the refractive power of the six-piece optical lens system with a wide field of view. Plastic lens elements can have aspheric surfaces, which allow more design parameter freedom (than spherical surfaces), so as to reduce the aberration and the number of the lens elements, as well as the total track length of the six-piece optical lens system with a wide field of view.

In the present six-piece optical lens system with a wide field of view, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The six-piece optical lens system with a wide field of view of the present invention can be used in focusing optical systems and can obtain better image quality. The six-piece optical lens system with a wide field of view of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. A six-piece optical lens system with a wide field of view, in order from an object side to an image side, comprising:
  a first lens element with a negative refractive power, having an object-side surface being convex near an optical axis and an image-side surface being concave near the optical axis, at least one of the object-side surface and the image-side surface of the first lens element being aspheric;
  a second lens element with a positive refractive power, having an object-side surface being convex near the optical axis and an image-side surface being convex near the optical axis, at least one of the object-side surface and the image-side surface of the second lens element being aspheric;
  a stop;
  a third lens element with a positive refractive power, having an object-side surface being convex near the optical axis and an image-side surface being convex near the optical axis, at least one of the object-side surface and the image-side surface of the third lens element being aspheric;
  a fourth lens element with a negative refractive power, having an image-side surface being concave near the optical axis, at least one of an object-side surface and the image-side surface of the fourth lens element being aspheric;
  a fifth lens element with a positive refractive power, having an object-side surface being convex near the optical axis and an image-side surface being convex near the optical axis, at least one of the object-side surface and the image-side surface of the fifth lens element being aspheric; and
  a sixth lens element with a negative refractive power, having an object-side surface being convex near the optical axis an image-side surface being concave near the optical axis, at least one of the object-side surface and the image-side surface of the sixth lens element being aspheric and provided with at least one inflection point;
  wherein an Abbe number of the third lens element is V3, an Abbe number of the fourth lens element is V4, an Abbe number of the fifth lens element is V5, an Abbe number of the sixth lens element is V6, a focal length of the six-piece optical lens system with a wide field of view is f, a distance from the object-side surface of the first lens element to an image plane along the optical axis is TL, and they satisfy the following relations: $29<V3-V4<42$; $29<V5-V6<42$; $0.1<f/TL<0.4$.

2. The six-piece optical lens system with a wide field of view as claimed in claim 1, wherein a focal length of the first lens element is f1, a focal length of the second lens element is f2, and they satisfy the relation: $-0.5<f1/f2<-0.2$.

3. The six-piece optical lens system with a wide field of view as claimed in claim 1, wherein a focal length of the second lens element is f2, a focal length of the third lens element is f3, and they satisfy the relation: $4.0<f2/f3<7.0$.

4. The six-piece optical lens system with a wide field of view as claimed in claim 1, wherein a focal length of the third lens element is f3, a focal length of the fourth lens element is f4, and they satisfy the relation: $-1.05<f3/f4<-0.7$.

5. The six-piece optical lens system with a wide field of view as claimed in claim 1, wherein a focal length of the fourth lens element is f4, a focal length of the fifth lens element is f5, and they satisfy the relation: $-1.2<f4/f5<-0.8$.

6. The six-piece optical lens system with a wide field of view as claimed in claim 1, wherein a focal length of the fifth lens element is f5, a focal length of the sixth lens element is f6, and they satisfy the relation: $-0.7<f5/f6<-0.35$.

7. The six-piece optical lens system with a wide field of view as claimed in claim 1, wherein a focal length of the first lens element is f1, a focal length of the third lens element is f3, and they satisfy the relation: $-2.1<f1/f3<-1.5$.

8. The six-piece optical lens system with a wide field of view as claimed in claim 1, wherein a focal length of the second lens element is f2, a focal length of the fourth lens element is f4, and they satisfy the relation: $-6.0<f2/f4<-3.5$.

9. The six-piece optical lens system with a wide field of view as claimed in claim 1, wherein a focal length of the third lens element is f3, a focal length of the fifth lens element is f5, and they satisfy the relation: $0.65<f3/f5<1.1$.

10. The six-piece optical lens system with a wide field of view as claimed in claim 1, wherein a focal length of the fourth lens element is f4, a focal length of the sixth lens element is f6, and they satisfy the relation: $0.4<f4/f6<0.75$.

11. The six-piece optical lens system with a wide field of view as claimed in claim 1, wherein a focal length of the first lens element and the second lens element combined is f12, the focal length of the third lens element is f3, and they satisfy the relation: $-4.2<f12/f3<-2.8$.

12. The six-piece optical lens system with a wide field of view as claimed in claim 1, wherein a focal length of the second lens element and the third lens element combined is f23, a focal length of the fourth lens element is f4, and they satisfy the relation: −0.95<f23/f4<−0.67.

13. The six-piece optical lens system with a wide field of view as claimed in claim 1, wherein a focal length of the second lens element and the third lens element combined is f23, a focal length of the fourth lens element and the fifth lens element combined is f45, and they satisfy the relation: 0.05<f23/f45<0.5.

14. The six-piece optical lens system with a wide field of view as claimed in claim 1, wherein a focal length of the first lens element and the second lens element combined is f12, a focal length of the third lens element and the fourth lens element combined is f34, and they satisfy the relation: −1.65<f12/f34<−1.0.

15. The six-piece optical lens system with a wide field of view as claimed in claim 1, wherein a focal length of the third lens element and the fourth lens element combined is f34, a focal length of the fifth lens element and the sixth lens element combined is f56, and they satisfy the relation: 1.0<f34/f56<2.4.

16. The six-piece optical lens system with a wide field of view as claimed in claim 1, wherein a focal length of the fourth lens element and the fifth lens element combined is f45, a focal length of the sixth lens element is f6, and they satisfy the relation: −1.4<f45/f6<−2.5.

17. The six-piece optical lens system with a wide field of view as claimed in claim 1, wherein a focal length of the first lens element is f1, a focal length of the second lens element, the third lens element and the fourth lens element combined is f234, and they satisfy the relation: −1.3<f1/f234<−0.8.

18. The six-piece optical lens system with a wide field of view as claimed in claim 1, wherein a focal length of the second lens element, the third lens element and the fourth lens element combined is f234, a focal length of the fifth lens element is f5, and they satisfy the relation: 1.0<f234/f5<2.0.

19. The six-piece optical lens system with a wide field of view as claimed in claim 1, wherein a focal length of the second lens element, the third lens element and the fourth lens element combined is f234, a focal length of the fifth lens element and the sixth lens element combined is f56, and they satisfy the relation: 0.8<f234/f56<1.4.

20. The six-piece optical lens system with a wide field of view as claimed in claim 1, wherein a focal length of the first lens element, the second lens element and the third lens element combined is f123, a focal length of the fourth lens element is f4, and they satisfy the relation: −0.9<f123/f4<−0.5.

21. The six-piece optical lens system with a wide field of view as claimed in claim 1, wherein a focal length of the first lens element, the second lens element and the third lens element combined is f123, a focal length of the fourth lens element and the fifth lens element combined is f45, and they satisfy the relation: 0.05<f123/f45<0.4.

22. The six-piece optical lens system with a wide field of view as claimed in claim 1, wherein a focal length of the first lens element, the second lens element and the third lens element combined is f123, a focal length of the fourth lens element, the fifth lens element and the sixth lens element combined is f456, and they satisfy the relation: −0.5<f123/f456<−0.05.

* * * * *